United States Patent [19]

Kainer et al.

[11] 3,995,696
[45] Dec. 7, 1976

[54] CAPACITANCE TRANSDUCER LOAD SENSOR

[75] Inventors: Carl Edward Kainer; Gordon K. Wiegardt, both of Cedar Falls, Iowa

[73] Assignee: Deere & Company, Moline, Ill.

[22] Filed: Feb. 10, 1975

[21] Appl. No.: 548,584

[52] U.S. Cl. .............................. 172/7; 73/88.5 R; 73/141 A; 172/9
[51] Int. Cl.² ......................................... A01B 61/04
[58] Field of Search ......... 73/1 B, 88.5 R, 88.5 SD, 73/90, 140, 141 A, 143, 144, 89; 172/7–11; 317/246; 324/61 R; 340/200

[56] References Cited
UNITED STATES PATENTS

| | | | |
|---|---|---|---|
| 3,243,998 | 4/1966 | Vosteen | 73/141 A |
| 3,678,378 | 7/1972 | Trott et al. | 73/88.5 R |
| 3,732,553 | 5/1973 | Hardway, Jr. | 340/200 |
| 3,733,424 | 5/1973 | Pitts et al. | 73/88.5 R |
| 3,814,188 | 6/1974 | Ahne | 172/7 |

*Primary Examiner*—Paul E. Shapiro
*Assistant Examiner*—Vance Y. Hum

[57] ABSTRACT

A sensor for measuring the load exerted on a member includes two spaced apart, aligned stationary capacitor plates and a movable capacitor plate disposed intermediate the two stationary plates and spaced therefrom to form two air dielectric capacitors. The stationary plates are attached at one point to the member and the movable plate is connected by a shaft to a second point. Loading the member causes elastic deformation between the first and second points which causes the movable plate to move relative to the stationary plates. This relative movement causes differential changes in capacitance in the two capacitors which are detected and conditioned to form a usable control signal.

14 Claims, 5 Drawing Figures

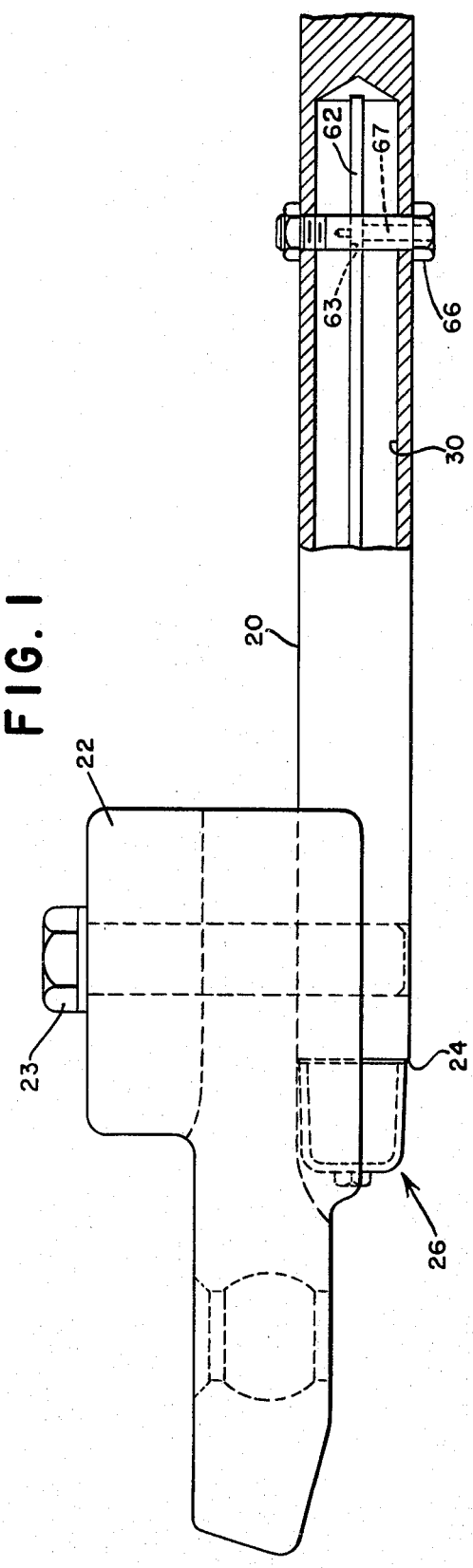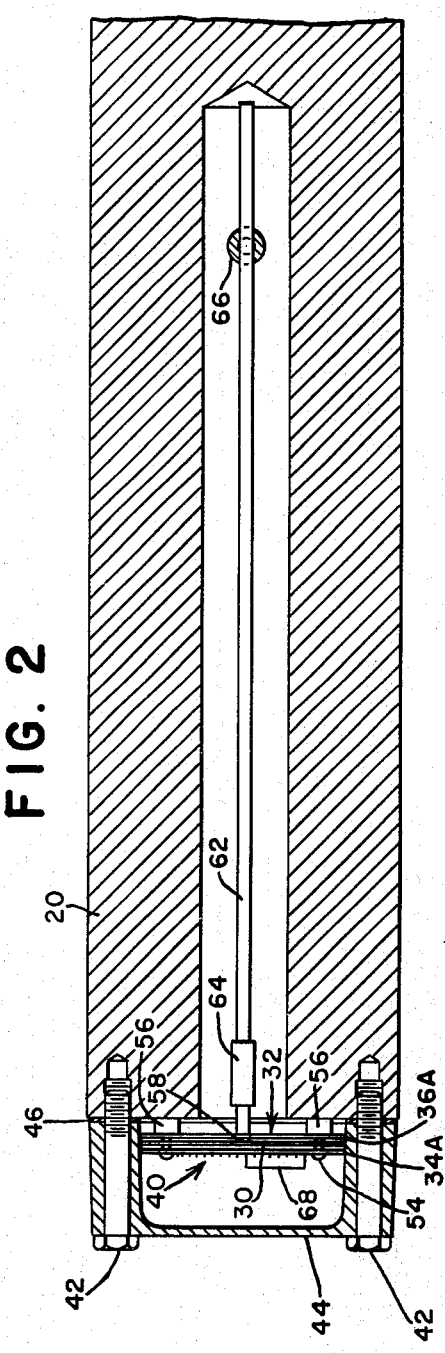

and more than 1% change. Also, the accuracy, durability, and

CAPACITANCE TRANSDUCER LOAD SENSOR

BACKGROUND OF THE INVENTION

This invention relates to load transducers and more particularly to a load transducer using a capacitance sensor for detecting the amount of strain on a measured member.

Strain gauges have heretofore been used for detecting loads exerted on members such as the draft links of a tractor hitch. Such systems are disclosed in the U.S. Pat. No. 3,246,701 issued Apr. 19, 1966 to Horst Schulz and the U.S. Pat. No. 3,814,188, issued June 4, 1974 to Jerome J. Ahne. However, the strain gauges heretofore used in these applications have been of the resistance type wherein a resistance wire is directly mounted to the structure which will undergo elastic deformation when the strain is applied. The resistance gauges are normally cemented to the structure with an adhesive having excellent electrical insulation and mechanical bonding qualities.

These resistance-type strain gauges have not been wholly satisfactory due to the fact that a signal-handling problem exists since the resistance change associated with the strain gauge is measured over a very minute distance and is quite small, being typically less than a 1% change. Also, the accuracy, durability, and reliability of a strain gauge of the resistance type is dependent upon environmental factors with the accuracy dropping off severely under high temperatures, and the durability being a function of the mechanical fatigue characteristics of the resistance gage material and/or the structure to which it is mounted. In addition, resistance gages, which are cemented to the loaded structure, can easily experience strains from loads other than the load desired to be measured, thus resulting in load detection errors.

Some capacitor-type strain gauges have been developed; an example of such a gauge is taught in U.S. Pat. No. 3,471,758 issued to Frank D. Werner on Oct. 7, 1969, wherein a strain carrying member forms part of a capacitor and a second member forms the other part. However, this type of gauge requires the structure to be carefully measured and prepared before measurements can be taken.

SUMMARY OF THE INVENTION

It is an object of this invention to present a load sensor employing parallel capacitors having a common movable plate as the sensor for detecting strain and which can easily be attached to the measured member. The sensor can measure strain between two widely separated points and is substantially independent of environmental factors.

BRIEF DESCRIPTION OF THE DRAWINGS

FIG. 1 is a side view of a draft link of an agricultural tractor specifically showing in cross section the attachment of the load sensor to the draft link.

FIG. 2 is a cross sectional view of a draft link of an agricultural tractor showing the mounting of the capacitance transducer of this invention.

DESCRIPTION OF THE PREFERRED EMBODIMENT

Figure 4:
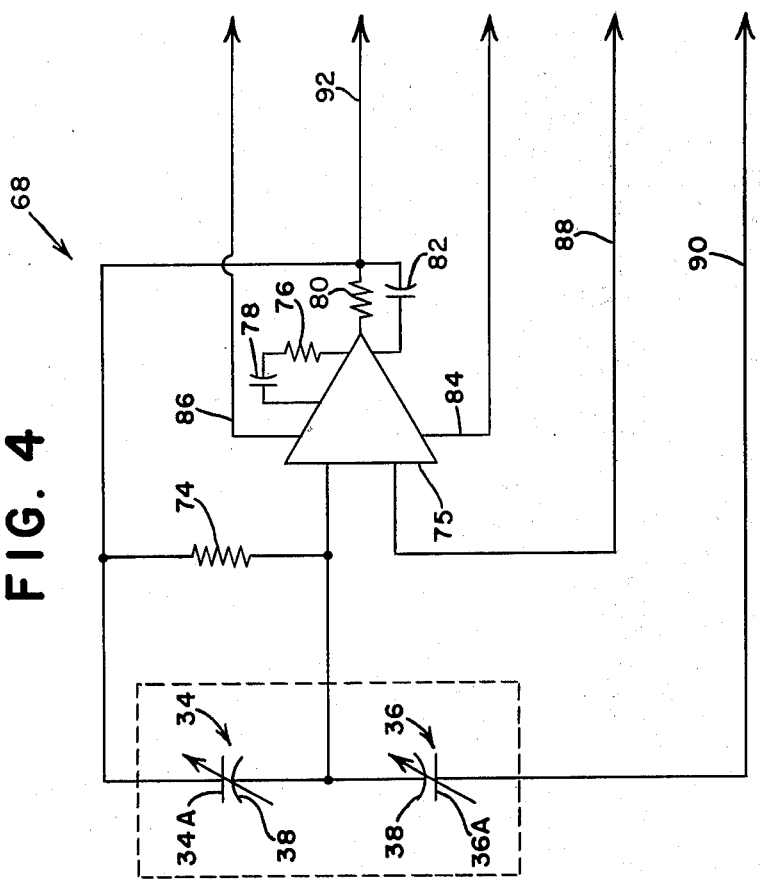
FIG. 4 is an electrical schematic of the load sensor circuit of this invention.

Referring now to FIGS. 1, 2, 3, and 4 of the drawings, a strain carrying member is shown in the form of a draft link 20 of an agricultural tractor (not shown). Even though the member is shown as a draft link, it must be emphasized that the transducer of this invention is in no way limited to use on an agricultural vehicle but can be used to measure the deformation or strain to which any structure is subjected and need not be integral with the structure as shown in the preferred embodiment.

Attaching means 22 is secured by a bolt 23 to the draft link 20 for coupling an implement to the tractor. Located at a rearward end 24 of the draft link 20 is a load sensor 26 of this invention. The draft link 20, in order to accommodate mounting of the load sensor 26, contains an internal bore 30. The bore 30 must be of a length sufficient to assure that the accumulation of the deformation under load shall be measured over a sufficient length of the draft link 20 to obtain the desired accuracy as will become apparent hereinafter.

The load sensor 26 includes a capacitance transducer 32 comprising two capacitors 34 and 36 formed by a first stationary plate 34A spaced from and aligned with a second stationary plate 36A. A common movable plate 38 is spaced from and intermediate the first and second stationary plates 34A and 36A. As seen in FIG. 2, the capacitors are part of a capacitance transducer assembly 40 attached to the outer end of the draft link 20 by appropriate means such as fasteners 54. A cover 44 held in place by bolts 42 protects the electrical circuitry from the environment and prevents the entrance of contaminants onto the capacitor plates. An appropriate gasket member 46 is used between the cover 44 and the end of the draft link 20 to further seal the internal parts from moisture and dirt.

Figure 3:
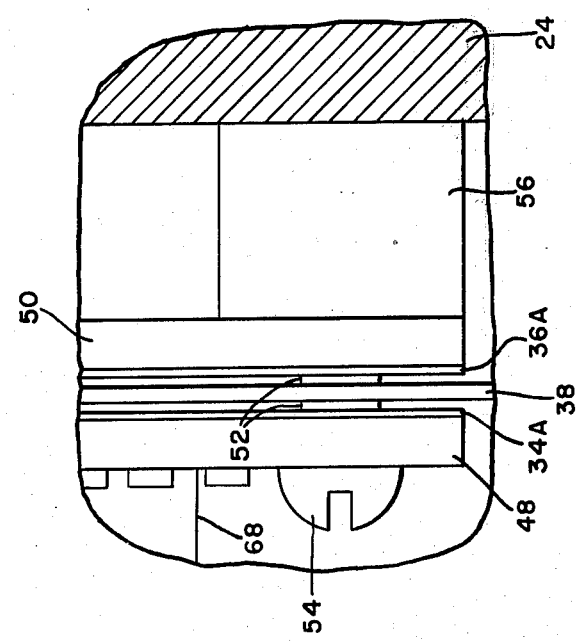
FIG. 3 is an enlarged view of a portion of the capacitance transducer of this invention.

Looking now especially at FIG. 3, it can be seen that the capacitance transducer assembly 40 includes the stationary plate 34A which is etched onto a conventionally made circuit board 48. Likewise, the second stationary plate 36A is etched on a second conventionally made circuit board 50. The movable plate 38 is disposed between the first and second stationary plates in such a manner so as to have a fixed no-load clearance. It has been found that clearances of 0.010 inch (0.254 mm) assures the desired results. In order to maintain the clearance, nonconductive spacers 52 are inserted between the movable plate 38 and the stationary plates 34A and 36A at the ends thereof and are held in place by the fasteners 54. Support members 56 of nonconductive material maintains a spacing between the capacitors and the draft link 20.

As shown in FIGS. 2 and 3, the capacitance transducer assembly 40 includes the circuit board 50 which contains capacitor plate 36A having a centrally aligned clearance hole 58 through which passes a load sensor shaft end 64. The shaft end is suitably coupled to the movable plate 38 on one end and to a load sensor shaft 62 at the other by such expedients as epoxying. To compensate for thermal changes, the shaft 62 is the same material as the draft link 20. In order to electrically isolate the movable plate 38 from the shaft 62, the end 64 is made of glass-filled epoxy. A 0.125 inch (3.2 mm) diameter has been found to be a sufficient diameter for the shaft 62. The opposite end of the shaft 62 is inserted into a diametral hole 63 in a special cap screw 66 and locked in place by a set screw 67, as can be seen in FIG. 1. The special cap screw 66 is in turn secured to the draft link 20. Thus, the shaft 62 causes movement or deflection of the movable plate 38 when elastic deformation of the draft link 20 occurs between the bolt 66 and the end 24, a distance of approximately 10 inches (254 mm), as the draft link 20 is subjected to loading. Since it is the displacement between the bolt 66 and the end 24 which is being measured, the sensitivity of the capacitance transducer assembly 40 may be increased by increasing the length of the shaft 62 and thus the length of the draft link 20 spanned by the shaft 62.

The deflection of the movable plate 38 will cause the capacitance of the two capacitors to change in proportion to the amount of deflection, one directly and the other indirectly. This capacitance differential then can be used to affect input and feedback impedances of a load sensor circuit 68, the output of which is conditioned to control the actuation of a draft link control system (not shown) as is commonly known in the art to raise or lower the draft links 20 to obtain a desired draft load.

The load sensor circuit 68 is mounted adjacent the capacitor plates 34A and 36A. As can be seen in FIG. 2, one convenient method of mounting this amplifier circuit is to place the components thereof on the circuit board 48 on the side opposite capacitor plate 34A.

Turning now to FIG. 4, the internal components of the load sensor circiut 68 can be easily understood. The capacitors 34 and 36 are connected in series with the common movable plate 38 which is connected to the input of an inverting operational amplifier 75. The capacitor 36 forms a variable input impedance for the amplifier 75 while the capacitor 34 in parallel with a feedback resistor 74 forms the feedback impedance. The resistor 74 is needed to prevent the amplifier 75 from drifting into saturation. The load sensor circuit 68 further includes phase compensation elements comprising a resistor 76, a capacitor 78, and a capacitor 82 which provide the necessary stability and frequency response. A resistor 80 provides short circuit protection for the amplifier 75. Power for the amplifier 75 is obtained from a constant voltage source connected to leads 84 and 86. Normally, the lead 84 carries a positive voltage of 15 volts, while the lead 86 carries a negative voltage of 15 volts. Power supply common or ground for the circuit is carried on a lead 88. Excitation of the capacitor 36 is obtained on a lead 90 from an oscillator circuit which is located in a signal conditioning circuitry which will subsequently be described. The output of the load sensor circuit 68 is fed into the signal conditioning circuit through a lead 92. Locating the amplifier 75 in close proximity to the capacitor plates produces a high level signal which can be transmitted by wire for relatively long distances to the signal conditioning circuitry.

Figure 5:
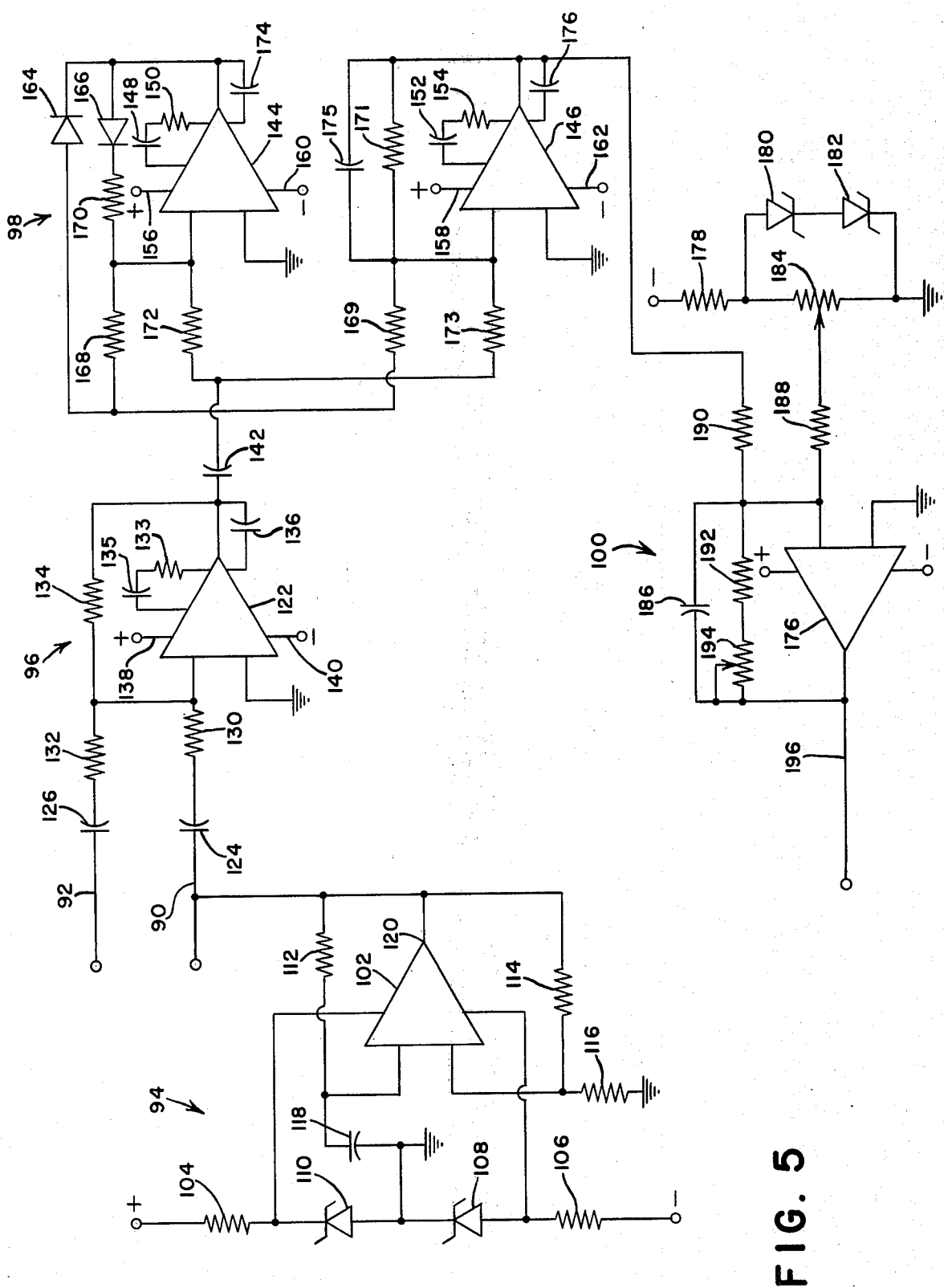
FIG. 5 is an electrical schematic of the signal conditioning circuitry of this invention.

Turning now to the load conditioning circuitry shown in FIG. 5, it includes an oscillator circuit 94 for generating a square wave signal, a summing circuit 96 for comparing the signal returning from the load sensor circuit 68 with the signal sent from the oscillator circuit 94, a full wave rectifier circuit 98 for rectifying a square wave signal of the summing circuit 96, and a filtering output amplifier circuit 100 for amplifying and smoothing the rectifier circuit 98 output to produce an output signal which is used to initiate various conventional readout devices or control circuits to obtain desired functions.

The oscillator circuit 94 includes an operational amplifier 102 which is energized by a conventional positive voltage through a resistor 104 and by a conventional negative voltage through a resistor 106. Zener diodes 108 and 110 in series with the resistors 104 and 106 regulate the amplitude of the square wave signal and resistors 112, 114 and 116 along with a capacitor 118 determine the frequency and duty cycle.

The output of the oscillator circuit 94 is connected by the lead 90 to the capacitor plate 36A of the load sensor circuit 68 and to the summing circuit 96.

With the plates 34A and 36A equidistant from the movable plate 38, the output of the load sensor circuit 68 will be a square wave of equal amplitude and frequency as that from the oscillator circuit 94. However, since the load sensor circuit 68 contains an inverting amplifier 75, the output is 180° out of phase with the input. Thus, with the condition of equidistant plates, the algebraic sum of the two signals will be equal to zero.

The summing circuit 96 is connected to the oscillator circuit 94 and the load sensor circuit 68 through coupling capacitors 124 and 126 respectively, which blocks out any undesired direct-current voltage. The summing circuit 96 output is proportional to the sum of the amplitude of the load sensor output and the amplitude of the oscillator output. Resistors 130, 132 and 134 determine the gain of the summing circuit 96. Resistor 133 and capacitors 135 and 136 are connected to an operational amplifier 122 to provide phase conmpensation in the conventional manner. The amplifier 122 is energized by a positive voltage through a lead 138 and is energized by a negative voltage through a lead 140. The output of the summing circuit 96 is fed through a coupling capacitor 142 into the conventional full-wave rectifier circuit 98.

The rectifier circuit 98 includes two operational amplifiers 144 and 146. The first is externally compensated by capacitors 148 and 174 and a resistor 150, and the second by capacitors 152 and 176 and a resistor 154, respectively. The positive voltage for the amplifier 144 is provided over a lead 156 and for the amplifier 146 over a lead 158. Similarly, negative voltage for the amplifier 144 is provided over a lead 160 and for the amplifier 146 over a lead 162. The purpose of the amplifier 144 is to adjust the amplitude of the square wave signal received from the summing circuit 96 to avoid the voltage drop from rectifying diodes 164 and 166. A plurality of resistors 168, 169, 170, 171, 172 and 173 are inserted in the rectifier circuit 98 to set the amplitude of the half wave signals equal to each other to obtain a symmetrical signal. In addition, a capacitor 175 is added to the circuit to filter out the irregularities in the signals which may be present because of unsymmetrical half-wave signals. The rectified signal which has been converted from the square wave signal to a direct-current voltage signal, is fed to resistor 190 which is a part of the final output amplifier circuit 100 which, through amplification and filtering, readies the signal for distribution to a command control system as before mentioned such as to the control circuit for energizing a electro-hydraulic valve which, in turn, controls the raising or lowering of the draft links 20 of the tractor.

The output amplifier circuit 100 includes an operational amplifier 176 and is supplied a reference voltage of negative potential through a resistor 188. This reference voltage is regulated by series zener diodes 180 and 182 and resistor 178. A potentiometer 184, connected in parallel with the diodes 180 and 182, permits zeroing of the output of an amplifier 176 when there is no strain on the draft links 20. The gain of the output amplifier circuit 100 is set by the values of a capacitor 186, resistors 188 and 192, and the calibration potentiometer 194. The output of the amplifier 176 is carried over a lead 196.

In the description of the operation, the effect of the resistors will be ignored, but those skilled in the art will recognize that the resistors are necessary to limit the current and provide the proper voltages for circuit operation.

The operation of the device is quite simple. When the load sensor 26 is attached to the draft links 20 as heretofore explained, the potentiometer 184 is adjusted so that no signal is generated at the output of the output amplifier circuit 100 at zero strain on the draft links 20. With a known load applied to the draft links 20, the calibration potentiometer 194 is adjusted to provide the desired output voltage signal proportional to the load. When a load is put on the draft links 20, as when the tractor pulls an implement or other apparatus in the field, the strain induces elastic deformation in the draft link 20 which causes deflection or movement of the movable plate 38 changing its clearance relative to the stationary plates 34A and 36A. This, in turn, causes a change in capacitance which changes the amplitude of the square wave output signal from the load sensor circuit 68. The square wave is compared with the square wave output of the oscillator circuit 94 by the summing circuit 96. The output of the summing circuit 96 is then fed into the rectifier circuit 98 in order to convert the varying amplitude square wave signal to a direct current voltage signal which is further amplified and filtered by the output amplifier circuit 100 to produce an output signal which can be utilized in various ways. For instance, the signal from the output amplifier circuit 100 could be sent to an indicating meter which would merely record the strain on the draft links. Another way the output signal could be utilized would be to feed the signal through the control circuit of the electro-hydraulic valve controlling the hydraulic cylinders which control the raising and lowering of the draft links 20 of the tractor.

Thus it is apparent that there has been provided in accordance with the invention a capacitance transducer load sensor that fully satisfies the objects, aims and advantages set forth above. While the invention has been described in conjunction with the specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. In a draft control system for controlling the movement of the draft links of an agricultural tractor in response to strain on a draft link, a load sensor comprising: a capacitance transducer having first and second stationary capacitor plates secured to one of the draft links in fixed, parallel, and spaced positions with respect to each other, said transducer including a movable capacitor plate spaced from and interposed between the stationary plates to form, in cooperation therewith, two capacitors; and means for securing the movable plate to the one of the draft links at a point remote from the securement between the stationary plates and the one of the draft links whereby deformation of the one of the draft links between the point of securement of the movable plate to the one of the draft links and the point of securement between the stationary plates and the one of the draft links moves the movable plate relative to the stationary plates to change capacitance values of the capacitors in proportion to the deformation.

2. The invention as claimed in claim 1 wherein the means securing the movable plate to the one of the draft links includes an elongated shaft having one end secured to the movable plate and a second end secured to the one of the draft links whereby the accumulative deformation of the member is measured in the length of the member spanned by the shaft.

3. The invention as claimed in claim 2 wherein the one of the draft links includes a longitudinal bore open to one end and closed to the other end and the elongated shaft extends into the open end and is secured proximate the closed end.

4. The invention claimed in claim 3 including signal means for providing an input signal, means for providing the input signal to the capacitance transducer wherein the signal is increased or decreased by the capacitance transducer in proportion to the deformation proportional capacitance values to provide an output signal, sensor means operatively connected to the capacitance transducer to receive and process the output signal to provide a modified signal proportional to the output signal, and signal conditioning means connected to the signal means and the sensor circuit for comparing the input and modified signal to provide a control signal proportional to the deformation.

5. The invention claimed in claim 4 wherein the signal means includes means for oscillating the input signal, the sensor means includes means for inverting the output signal from the capacitance transducer to provide the modified signal, and the signal conditioning means includes summing means for summing the modified signals to provide a summed output signal, said signal conditioning means further including rectifier means for converting the summed output signal into a non-oscillating output signal, and output amplifier means for amplifying the non-oscillating output signal to provide a usable control signal for the draft control system.

6. In a hitch system having pivotal draft links adapted to connect to an implement and a control system for controlling pivotal movement of the draft links in response to a conditioned signal representative of the load on the draft links, a load sensor comprising: a capacitance transducer having a first and secondary stationary capacitor plates secured to one of the draft links in fixed, parallel, and spaced positions with respect to each other, said capacitance transducer including a capacitor plate movable perpendicular to the plane of the stationary plates spaced from and interposed between the stationary plates to form, in cooperation therewith, two capacitors; a shaft attached at one end to the movable plate and at the far end to the one of the draft links whereby load induced strain between the stationary plates and the far end of the shaft causes the movable plate to move and change the capacitance values of the capacitors; and electrical circuitry connected to the capacitor plates and producing a conditioned signal representative of the sensed change in the capacitance values of the capacitors whereby the load induced strain on the draft link produces a signal proportional to the load on the draft links.

7. The invention as claimed in claim 6 wherein the draft link includes a longitudinal bore open to one end and closed to the other end; the load sensor protrudes into the open end and attaches to the closed end; and signal conditioning circuitry located away from the draft link.

8. The invention as claimed in claim 7 wherein the electrical circuitry includes: signal means for providing an input signal, means for providing the input signal to the capacitance transducer wherein the signal is increased or decreased by the capacitance transducer in proportion to the deformation proportional capacitance values to provide an output signal, sensor means operatively connected to the capacitance transducer to receive and process the output signal to provide a modified signal proportional to the output signal, and signal conditioning means connected to the signal means and the sensor circuit for comparing the input and modified signal to provide a control signal proportional to the deformation capable of use in controlling the draft links.

9. The invention as claimed in claim 8 wherein the signal means includes an oscillator circuit connected to the load sensor circuit for generating an oscillating signal and the signal conditioning means includes: a summing circuit connected to the oscillator circuit for summing the oscillating signal from the oscillator and the output of the load sensor means and producing an output proportional to the sum thereof; a rectifier circuit for filtering and converting the output of the summing circuit into a direct-current voltage signal output; and an output amplifier for amplifying the direct-current voltage signal output to provide the control signal.

10. A sensor for measuring deformation in a member comprising: a capacitance transducer having first and second stationary capacitor plates secured to each other in fixed, parallel, and spaced positions with respect to each other and securable to the member at a first point; said capacitance transducer including a movable capacitor plate spaced from and interposed between the stationary plates to form, in cooperation therewith, two capacitors; means for securing the movable plate to the member including an elongated shaft having one end secured to the movable plate and a second end securable to the member remote from the movable plate whereby the accumulative deformation of the member is measured in the length of the member spanned by the shaft; oscillator means for providing an oscillating input signal to the capacitance transducer wherein the input signal is increased or decreased in proportion to the deformation to provide an output signal; sensor means connected to the capacitance transducer to receive the output signal including means for inverting the output signal from the capacitance transducer to provide a modified signal, and signal conditioning means connected to the signal means and the sensor means including summing means for summing the input and modified signals to provide a summed output signal, said signal conditioning means further including rectifier means for converting the summed output signal into a control signal, said control signal being non-oscillating.

11. A sensor for measuring deformation in a member comprising: oscillator means for providing an oscillating input signal; capacitance transducer means securable to the member between a first and second points and having a capacitance variable with and proportional to the deformation in the member between the first and second points, said transducer means for receiving and increasing or decreasing the oscillating input signal in proportion to the capacitance to provide an oscillating output signal; sensor means connected to the transducer means for receiving and inverting the output from the transducer means to provide an inverted output signal; summing means connected to the oscillator and sensor means to sum the input and inverted output signals to provide a summed output signal; and rectifier means for receiving and processing the summed output signal to provide a non-oscillating control signal.

12. The invention as claimed in claim 11 wherein the capacitance transducer means includes a first stationary capacitor plate connected to the oscillator means, a second stationary capacitor plate connected to the sensor circuit and fixed in spaced, parallel relationship with the first stationary capacitor plate and securable therewith at the first point, a movable capacitor plate connected to the sensor means and spaced from and interposed between the stationary plates to form in cooperation therewith, two capacitor plates, and means for securing the movable plate to the member at a second point whereby deformation of the member between the first and second points moves the movable plate relative to the stationary plates to change the capacitance of the capacitors in proportion to the deformation.

13. In a draft control system for controlling the movement of the draft links of an agricultural tractor in response to strain on a draft link, a load sensor comprising: oscillator means for providing an oscillating input signal; capacitance transducer means securable to the draft link between a first and second points and having a capacitance variable and proportioned to the deformation in the draft link between the first and second points, said capacitance transducer means for receiving an increasing or decreasing oscillating input signal in proportion to the capacitance to provide an oscillating output signal; sensor means connected to the transducer means for receiving and inverting the output from the transducer means to provide an inverted output signal; summing means connected to the oscillator and sensor means to sum the input and inverted output signals to provide a summed output signal; rectifier means for receiving and processing the summed output signal to provide a non-oscillating control signal for controlling the draft control system.

14. The invention as claimed in claim 13 wherein the capacitance transducer means includes a first stationary capacitor plate connected to the oscillator means, a second stationary capacitor plate connected to the sensor circuit and fixed in spaced, parallel relationship with the first stationary capacitor plate and securable therewith at the first point, a movable capacitor plate connected to the sensor means and spaced from and interposed between the stationary plates to form in cooperation therewith, two capacitor plates, and means for securing the movable plate to the draft link at a second point whereby deformation of the draft link between the first and second point moves the movable plate relative to the stationary plates to change the capacitance of the capacitors in proportion to the deformation.

* * * * *